(12) United States Patent
Nishijima et al.

(10) Patent No.: US 7,726,150 B2
(45) Date of Patent: Jun. 1, 2010

(54) EJECTOR CYCLE DEVICE

(75) Inventors: Haruyuki Nishijima, Obu (JP);
 Hirotsugu Takeuchi, Nagoya (JP);
 Etsuhisa Yamada, Kariya (JP); Makoto Ikegami, Anjo (JP); Hiroshi Oshitani, Toyota (JP)

(73) Assignee: Denso Corporation, Kariya (JP)

( * ) Notice: Subject to any disclaimer, the term of this patent is extended or adjusted under 35 U.S.C. 154(b) by 518 days.

(21) Appl. No.: 11/501,557

(22) Filed: Aug. 9, 2006

(65) Prior Publication Data

US 2007/0039337 A1 Feb. 22, 2007

(30) Foreign Application Priority Data

Aug. 18, 2005 (JP) ............................. 2005-237650

(51) Int. Cl.
 *F25B 1/06* (2006.01)
(52) U.S. Cl. ..................... 62/500; 62/170; 62/199; 62/200
(58) Field of Classification Search ............. 62/500, 62/199, 200, 170, 191, 86, 471, 528, 168; 417/151, 168
See application file for complete search history.

(56) References Cited

U.S. PATENT DOCUMENTS

| | | | | |
|---|---|---|---|---|
| 6,477,857 B2* | 11/2002 | Takeuchi et al. | ............... | 62/500 |
| 6,574,987 B2* | 6/2003 | Takeuchi et al. | ............... | 62/500 |
| 6,705,094 B2* | 3/2004 | Alsenz | ......... | 62/116 |
| 6,857,286 B2* | 2/2005 | Ohta et al. | ............ | 62/498 |
| 7,000,427 B2* | 2/2006 | Mathias et al. | ............ | 62/612 |
| 7,254,961 B2* | 8/2007 | Oshitani et al. | ............. | 62/500 |
| 2002/0184903 A1* | 12/2002 | Takeuchi et al. | ............. | 62/175 |
| 2005/0011221 A1* | 1/2005 | Hirota | ............ | 62/500 |
| 2005/0178150 A1 | 8/2005 | Oshitani et al. | | |
| 2005/0268644 A1 | 12/2005 | Oshitani et al. | | |
| 2006/0266072 A1 | 11/2006 | Takeuchi et al. | | |

FOREIGN PATENT DOCUMENTS

| | | |
|---|---|---|
| JP | 57-124086 | 1/1956 |
| JP | 52-36354 | 3/1977 |
| JP | 03291465 A * | 12/1991 |

OTHER PUBLICATIONS

U.S. Appl. No. 11/439,415, filed May 23, 2006, Takeuchi et al.
U.S. Appl. No. 11/503,895, filed Aug. 14, 2006, Takeuchi et al.
Office action dated Jan. 6, 2010 in corresponding Japanese Application No. 2005-237650.

* cited by examiner

*Primary Examiner*—Cheryl J Tyler
*Assistant Examiner*—Justin Loffredo
(74) *Attorney, Agent, or Firm*—Harness, Dickey & Pierce, PLC

(57) ABSTRACT

An ejector cycle device includes a compressor, a refrigerant radiator, an ejector having a nozzle part and a refrigerant suction port, and a branch passage for introducing refrigerant branched on an upstream side of the nozzle part of the ejector in a refrigerant flow into the refrigerant suction port. Furthermore, a first evaporator is arranged on a downstream side of the ejector in the refrigerant flow, and a second evaporator is arranged in the branch passage. In addition, in the ejector cycle device, a refrigerant flow rate ratio ($\alpha$) of a flow rate of refrigerant flowing in the second evaporator to a flow rate of refrigerant discharged from the compressor is set within a range from 0.07 or more to 0.93 or less.

22 Claims, 6 Drawing Sheets

EJECTOR CYCLE DEVICE

CROSS REFERENCE TO RELATED APPLICATION

This application is based on Japanese Patent Application No. 2005-237650 filed on Aug. 18, 2005, the contents of which are incorporated herein by reference in its entirety.

BACKGROUND OF THE INVENTION

1. Field of the Invention

The present invention relates to an ejector cycle device including an ejector for drawing refrigerant and a plurality of evaporators. The ejector cycle device can be effectively used for, for example, an air conditioner or a freezing device for freezing or/and refrigeration.

2. Description of the Related Art

A known ejector cycle device of this type is disclosed in JP Patent No. 3322263 (corresponding to U.S. Pat. Nos. 6,477,857, and 6,574,987). In this ejector cycle device, a first evaporator is arranged between a vapor/liquid separator and a downstream side in a flow of refrigerant of an ejector acting as the pressure of refrigerant and means for circulating refrigerant, and a second evaporator is arranged between the outlet of liquid refrigerant of the vapor/liquid separator and the suction port of refrigerant of the ejector.

According to this ejector cycle device, vapor-phase refrigerant discharged from the second evaporator is drawn into the ejector by the use of a pressure drop caused by a high-velocity flow of refrigerant at the time of expansion, and the velocity energy of refrigerant in expansion is converted to pressure energy in a diffuser part (pressure increasing part) so as to increase the pressure of refrigerant to be drawn into the compressor. Hence, the driving power of a compressor can be reduced.

These two evaporators can exert the action of absorbing heat (cooling action) in separate spaces or in the same space. Further, the JP Patent No. 3322263 describes that these two evaporators may cool a room.

However, in this ejector cycle device, the mass flow rate (hereinafter, mass flow rate is simply referred to as "flow rate") of refrigerant branched to the second evaporator depends on the refrigerant drawing function of the ejector and hence the flow rate of refrigerant branched to the second evaporator cannot be independently adjusted.

SUMMARY OF THE INVENTION

In view of the foregoing problems, it is a first object of the present invention to increase coefficient of performance (COP) of an ejector cycle device with at least first and second evaporators.

Another object of the present invention is to provide an ejector cycle device capable of providing a high COP by the means for appropriately setting a flow rate of refrigerant supplied to an evaporator arranged between an upstream side of the ejector and a suction port of the ejector.

An ejector cycle device of the embodiments includes a compressor for drawing and compressing refrigerant; a refrigerant radiator for radiating heat of high-pressure refrigerant discharged from the compressor; an ejector having a nozzle part for decompressing refrigerant from the refrigerant radiator and a refrigerant suction port for drawing refrigerant by a high-velocity flow of refrigerant jetted from the nozzle part; a branch passage for introducing refrigerant branched on an upstream side of the nozzle part of the ejector in a refrigerant flow into the refrigerant suction port; a first evaporator arranged on a downstream side of the ejector in the refrigerant flow and for evaporating the refrigerant; and a second evaporator arranged in the branch passage and for evaporating the refrigerant.

According to an aspect of the present invention, a refrigerant flow rate ratio ($\alpha$) of a flow rate (Ge) of refrigerant flowing in the second evaporator to a flow rate (Gn) of refrigerant discharged from the compressor is set within a range from 0.07 or more to 0.93 or less. In this case, cooling capacity and the COP of the ejector cycle device can be effectively increased while the driving power in the compressor can be reduced. For example, the refrigerant flow rate ratio ($\alpha$) can be set within a range from 0.1 or more to 0.82 or less, or can be set within a range from 0.2 or more to 0.6 or less. In this example, the COP of the ejector cycle device can be further increased.

According to another aspect of the present invention, the first evaporator includes a heat exchange core part having a refrigerant passage volume as a first core part volume (Ce1), and the second evaporator includes a heat exchange core part having a refrigerant passage volume as a second core part volume (Ce2). Furthermore, when a total of the first core part volume (Ce1) of the heat exchange core part of the first evaporator and the second core part volume (Ce2) of the heat exchange core part of the second evaporator is assumed to be a total volume (Cn), a volume ratio ($\beta$) of the second core part volume (Ce2) to the total volume (Cn) is set within a range from 0.09 or more to 0.89 or less. In this case, cooling capacities of both the first evaporator and the second evaporator can be increased, and the COP of the ejector cycle device can be effectively increased. For example, the volume ratio ($\beta$) can be set within a range from 0.13 or more to 0.8 or less, or can be set within a range from 0.22 or more to 0.6 or less.

According to a further another aspect of the present invention, a flow ratio difference ($\alpha-\beta$) between the refrigerant flow rate ratio ($\alpha$) and the volume ratio ($\beta$) is set within a range from $-0.3$ or more to 0.3 or less. In this case, refrigerant can be suitably evaporated in both the first evaporator and the second evaporator, so as to increase the COP in the ejector cycle device. For example, the ratio difference ($\alpha-\beta$) can be set within a range from $-0.2$ or more to 0.2 or less or can be set within a range from $-0.1$ or more to 0.1 or less.

According to another aspect of the present invention, the first evaporator includes a heat exchange core part having a refrigerant passage area (Fer1), the second evaporator includes a heat exchange core part having a refrigerant passage area (Fer2), and the refrigerant passage area (Fer1) in the heat exchange core part of the first evaporator is larger than the refrigerant passage area (Fer2) in the heat exchange core part of the second evaporator. In this case, a refrigerant pressure loss in the first evaporator can be effectively reduced, thereby reducing the driving power of the compressor and increasing the COP.

According to a further another aspect of the present invention, the first evaporator has an air-side heat transfer area (Hea1) and a refrigerant-side heat transfer area (Her1), the second evaporator has an air-side heat transfer area (Hea2) and a refrigerant-side heat transfer area (Her2), and a heat transfer area ratio ($\gamma 2$) of the air-side heat transfer area (Hea2) to the refrigerant-side heat transfer area (Her2) in the second evaporator, is made larger than a heat transfer area ratio ($\gamma 1$) of the air-side heat transfer area (Hea1) to the refrigerant-side heat transfer area (Her1) in the first evaporator. In this case, the heat transfer efficiency of the second evaporator can be improved, thereby reducing the driving power of the compressor and increasing the COP.

In the ejector cycle device, the second evaporator may be arranged on a downstream side in a flow of air passing through the first evaporator. Furthermore, the first evaporator may be located to cool a first space, and the second evaporator may be located to cool a second space which is different from the first space. In addition, a plurality of the first evaporators may be arranged in parallel to a flow of refrigerant, and a plurality of the second evaporators may be arranged in parallel to a flow of refrigerant.

BRIEF DESCRIPTION OF THE DRAWINGS

Additional objects and advantages of the present invention will be more readily apparent from the following detailed description of preferred embodiments when taken together with the accompanying drawings.

DETAILED DESCRIPTION OF THE PREFERRED EMBODIMENTS

First Embodiment

Figure 1:
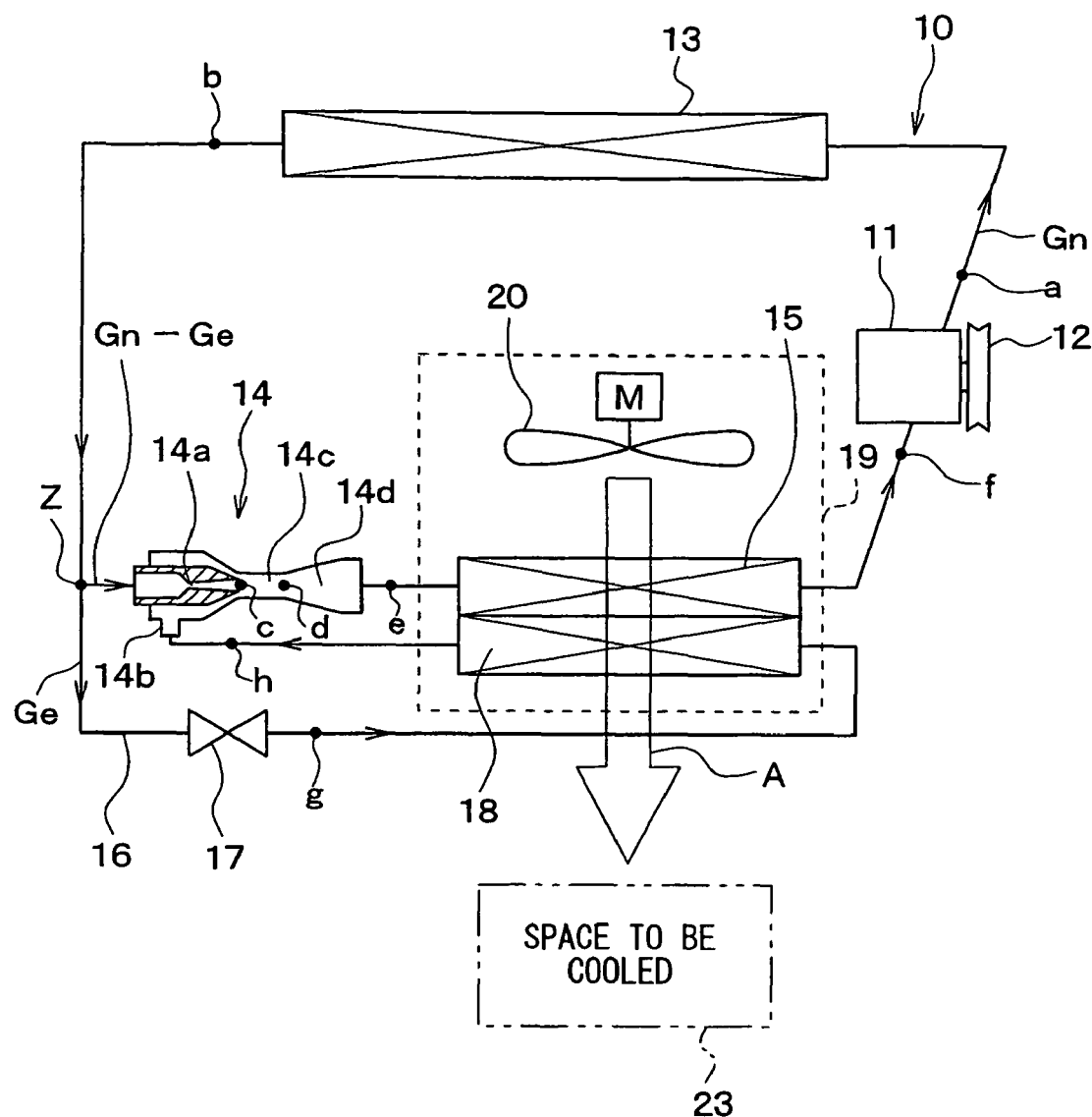
FIG. 1 is a schematic diagram of an ejector cycle device for explaining first to fifth embodiments of the present invention.

Hereinafter, a first embodiment of the present invention will be described on the basis of FIG. 1 to FIG. 4. FIG. 1 shows an example in which an ejector cycle device 10 according to the first embodiment is used for a freezing device for a vehicle. In the ejector cycle device 10 of this embodiment, a compressor 11 for drawing and compressing refrigerant is rotated and driven by an engine for driving a vehicle (not shown) via a pulley 12, a belt, or the like.

Either a variable displacement compressor that can adjust a refrigerant discharge capacity by varying a discharge rate or a fixed displacement compressor that varies the rate of operation of a compressor by operating an electromagnetic clutch intermittently to adjust a refrigerant discharge capacity may be used as this compressor 11. Moreover, when an electrically operated compressor is used as the compressor 11, a refrigerant discharge capacity can be adjusted by adjusting the number of revolutions of an electric motor.

A refrigerant radiator 13 is arranged on a refrigerant discharge side of this compressor 11. The refrigerant radiator 13 exchanges heat between high-pressure refrigerant discharged from the compressor 11 and outside air (air outside a vehicle compartment) blown by a cooling fan (not shown) to cool the high-pressure refrigerant.

In this embodiment, R404A is used as the refrigerant of the ejector cycle device 10. When an ejector cycle device uses a flon-based refrigerant such as R404A, the ejector cycle device becomes a subcritical cycle in which high pressure does not exceed a critical pressure and hence the refrigerant radiator 13 acts as a condenser for condensing the refrigerant.

In contrast, when an ejector cycle device uses refrigerant such as carbon dioxide ($CO_2$) having high pressure higher than a critical pressure, the ejector cycle device becomes a supercritical cycle and hence refrigerant only radiates heat as it is in a supercritical state and is not condensed.

An ejector 14 is arranged at a portion on a more downstream side of flow of refrigerant than the refrigerant radiator 13. This ejector 14 is a pressure reducing means for reducing the pressure of refrigerant and a momentum transport pump for transporting refrigerant by the action of drawing refrigerant flow jetted at a high speed.

The ejector 14 has a nozzle part 14a, which throttles the area of passage of high-pressure refrigerant flowing from the refrigerant radiator 13 to reduce the pressure of the high-pressure refrigerant and expand it in an isentropic manner, and a refrigerant suction port 14b, which is arranged in the same space as the refrigerant jet port of the nozzle part 14a and sucks vapor-phase refrigerant from a second evaporator 18 to be described later.

A mixing part 14c for mixing a high-speed flow refrigerant jetted from the nozzle part 14a with refrigerant drawn from the refrigerant suction port 14b is arranged at a portion on a more downstream side in the flow of refrigerant than the nozzle part 14a and the refrigerant suction port 14b. A diffuser part 14d forming a pressure increasing portion is arranged on a downstream side in the flow of refrigerant than the mixing part 14c. This diffuser part 14d is formed in a shape to gradually increase the area of passage of refrigerant and performs the action of reducing the velocity of the flow of refrigerant to increase the pressure of refrigerant, that is, the action of converting the velocity energy of refrigerant to pressure energy.

A first evaporator 15 is connected to the downstream side of the diffuser part 14d of the ejector 14, and the downstream side in the flow of refrigerant of this first evaporator 15 is connected to the suction side of the compressor 11.

A refrigerant branch passage 16 is branched at a branch point Z on the upstream side of the nozzle part 14a of the ejector 14 at a portion between the refrigerant radiator 13 and the ejector 14. The downstream side of this refrigerant branch passage 16 is connected to the refrigerant suction port 14b of the ejector 14.

A throttle mechanism 17 is arranged in this refrigerant branch passage 16 and the second evaporator 18 is arranged at a downstream portion in the flow of refrigerant than this throttle mechanism 17. The throttle mechanism 17 is pressure reducing means for adjusting a flow rate Ge of branch refrigerant flowing to the second evaporator 18. Specifically, the throttle mechanism 17 can be constructed of a fixed throttle such as an orifice. Moreover, an electric control valve capable of adjusting the degree of opening of a valve (degree of throttle of a passage) by an electrically operated actuator may be used as the throttle mechanism 17.

Since the refrigerant branch passage 16 is branched at the branch point Z, a mass flow rate Gn of refrigerant discharged from the compressor 11 is divided into a flow rate Ge of refrigerant flowing in the second evaporator 18 and a flow rate (Gn-Ge) of refrigerant flowing in the nozzle part 14a of the ejector 14.

Here, it is assumed that a ratio Ge/Gn of the flow rate Ge of branch refrigerant flowing in the second evaporator 18 to a flow rate Gn of discharge refrigerant discharged from the compressor 11 is a refrigerant flow rate ratio α. In this embodiment, the degree of throttle of the throttle mechanism 17 is set so that the refrigerant flow rate ratio α is within a range from 0.07 or more to 0.93 or less.

By the way, in this embodiment, two evaporators 15, 18 are housed in one case 19. The first evaporator 15 connected to the main passage on the downstream side of the ejector 14 is arranged on the upstream side in the flow of air A in the case 19, and the second evaporator 18 connected to the refrigerant suction port 14b of the ejector 14 is arranged on the downstream side of the first evaporator 15 in the flow of air A.

Figure 2:
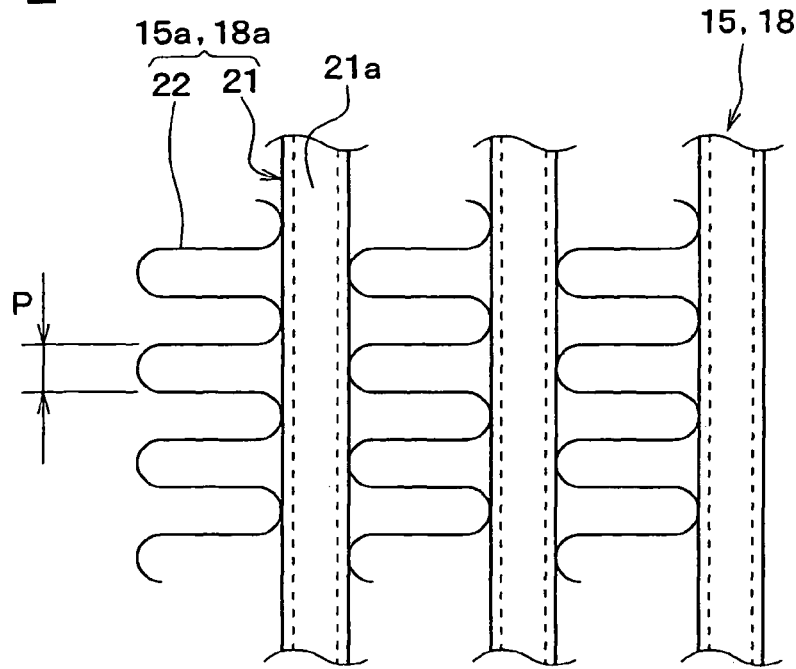
FIG. 2 is an enlarged view of a portion in first and second evaporators in FIG. 1.

FIG. 2 is an enlarged view of a portion in the first and second evaporators 15 and 18. Each of the two evaporators 15, 18, as is well known, is constructed of a heat exchange core part 15a, 18a and a tank part (not shown) that distributes refrigerant to a plurality of tubes 21 and collects refrigerant flowing out of the plurality of tubes 21. The heat exchange core part 15a, 18a is formed in a laminated structure of corrugated heat transmitting fins 22 and the plurality of tubes 21.

In this embodiment, the tubes 21, the heat transmitting fins 22, and the tanks of the first evaporator 15 and the second evaporator 18 are formed of aluminum, which is excellent in heat conduction and brazing ability. The respective parts formed of this aluminum material are integrally brazed to each other, thereby being integrally assembled into the first and second evaporators 15, 18, respectively.

The first and second evaporators 15, 18 may be separated from each other in structure, and the first evaporator 15 may be arranged on the upstream side in the flow of air A and the second evaporator 18 may be arranged on the downstream side in the flow of air A.

Air (i.e., fluid to be cooled), as shown by arrow A, is blown by a common electrically operated blower 20 to an air passage defined in the case 19 and this blown air A is cooled by the two evaporators 15, 18. The air cooled by the two evaporators 15, 18 is blown to a common space 23 to be cooled.

When the ejector cycle device 10 of this embodiment is used for a refrigeration device for a freezer car, a space in a refrigeration/cold storage box of the refrigeration car becomes the space 23 to be cooled. Moreover, when the ejector cycle device 10 of this embodiment is used for a refrigeration cycle device for a vehicle air conditioner, a space in a vehicle compartment becomes the space 23 to be cooled.

Next, an operation in the ejector cycle device 10 will be described on the basis of a p-h diagram in FIG. 3. Here, operation points "a" to "h" in FIG. 3 correspond to positions "a" to "h" in FIG. 1. When the compressor 11 is started, vapor-phase refrigerant is drawn from the first evaporator 15 into the compressor 11 and a flow rate Gn of compressed refrigerant is discharged to the refrigerant radiator 13 (f→a). In the refrigerant radiator 13, the high-temperature refrigerant is cooled and condensed by the outside air (a→b).

A flow rate Gn of high-pressure refrigerant flowing out of the refrigerant radiator 13 is divided at the branch point Z into a flow rate Ge of refrigerant flowing to the branch refrigerant passage 16 and a flow rate (Gn-Ge) of refrigerant flowing to the nozzle part 14a of the ejector 14.

The flow rate (Gn-Ge) of refrigerant flowing into the ejector 14 is reduced in pressure and expanded approximately in isentropic at the nozzle part 14a (b→c). Hence, the refrigerant has its pressure energy converted to velocity energy by the nozzle part 14a and is jetted from the jet port of this nozzle part 14a at a high velocity. At this time, a flow rate Ge of vapor-phase refrigerant is drawn from the second evaporator 18 to the refrigerant suction port 14b by a pressure drop in the flow of refrigerant jetted at the high velocity from the nozzle part 14a.

The refrigerant jetted from the nozzle part 14a is mixed with the refrigerant drawn into the refrigerant suction port 14b in the mixing part 14c on the downstream side of the nozzle part 14a (c→d, h→d) and the mixed refrigerant is flowed into the diffuser part 14d. In this diffuser part 14d, the velocity (expansion) energy of refrigerant is converted to pressure energy by the expansion of area of passage, and hence the pressure of refrigerant is increased (d→e).

The flow rate Gn of refrigerant flowing out of the diffuser part 14d of the ejector 14 flows into the first evaporator 15. In the first evaporator 15, low-temperature low-pressure refrigerant absorbs heat from air blown in the direction of arrow A and evaporates at the heat exchange core part 15a (e→f). This vapor-phase refrigerant after evaporation is drawn and again compressed by the compressor 11.

In contrast, the flow rate Ge of refrigerant flowing into the branch refrigerant passage 16 has its pressure reduced by the throttle mechanism 17 and becomes low-pressure refrigerant (b→g) and flows into the second evaporator 18. In the second evaporator 18, refrigerant absorbs heat from air blown in the direction of arrow A and evaporates at the heat exchange core part 15a (g→h). This flow rate Ge of vapor-phase refrigerant after evaporation is drawn into the ejector 14 through the refrigerant suction port 14b.

As described above, the flow rate Gn of refrigerant can be supplied to the first evaporator 15 and the flow rate Ge of refrigerant on the branch passage 16 side can be supplied to the second evaporator 18 through the throttle mechanism 17. Hence, both the first and second evaporators 15, 18 can exert cooling action at the same time. For this reason, air cooled by both of the first and second evaporators 15, 18 can be blown off into the space 23 to be cooled, thereby being able to effectively cool the space 23.

In the ejector cycle device 10 shown in FIG. 1, the flow rate Gn of refrigerant discharged from the compressor 11 is branched at the branch point Z on the upstream side of the ejector 14 in the flow of refrigerant into the flow rate Ge of refrigerant flowing through the second evaporator 18 and the flow rate (Gn-Ge) of refrigerant flowing through the nozzle part 14a. The flow rate Ge of refrigerant evaporated by the second evaporator 18 is drawn by the ejector 14 and is mixed with the flow rate (Gn-Ge) of refrigerant flowing through the nozzle part 14a in a mixing part 14c of the ejector 14. This mixed refrigerant has its pressure increased in the mixing part 14c and the diffuser part 14d of the ejector 14, and flows into the first evaporator 15. Hence, the flow rate Gn of refrigerant flows through the first evaporator 15.

Figure 3:
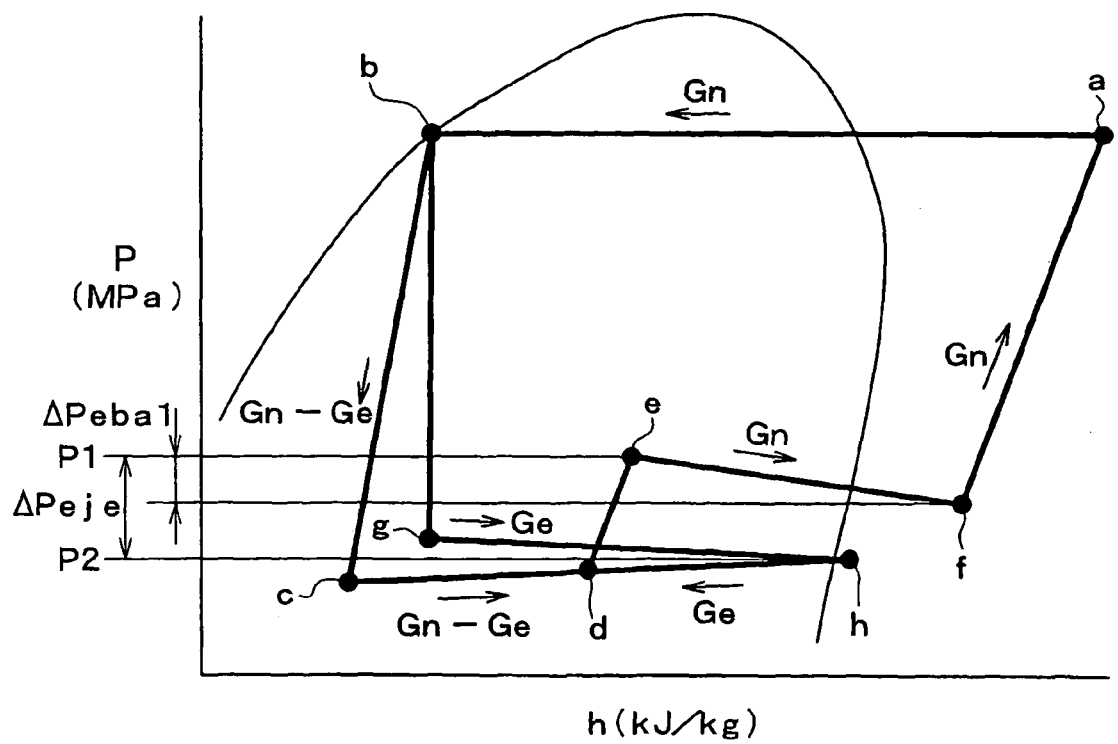
FIG. 3 is a p-h diagram in the ejector cycle device in FIG. 1.

By the way, the reference symbol ΔPeje indicated in FIG. 3 shows the amount of pressure increase by the ejector 14, that is, a pressure difference (P1-P2) between the pressure P1 of refrigerant flowing into the first evaporator 15 and the evaporation pressure P2 of refrigerant flowing into the second evaporator 18. The reference symbol ΔPeba1 shows a pressure loss of refrigerant in the first evaporator 15.

As described above, the evaporation pressure P2 of refrigerant in the second evaporator 18 is lower than the evaporation pressure (P1-ΔPeba1) of refrigerant at the outlet of the first evaporator 15. Hence, the evaporation temperature of refrigerant in the second evaporator 18 becomes lower than the evaporation temperature of refrigerant in the first evaporator 15.

The first evaporator 15 having a higher evaporation temperature of refrigerant is arranged on the upstream side in the flow direction A of blown air, and the second evaporator 18 having a lower evaporation temperature of refrigerant is arranged on the downstream side of the first evaporator 15 in the flow direction A of blown air. Hence, both of a difference between the evaporation temperature of refrigerant in the first evaporator 15 and the temperature of blown air and a difference between the evaporation temperature of refrigerant in the second evaporator 18 and the temperature of blown air can be secured.

For this reason, the first and second evaporators 15, 18 can effectively exert their cooling capacities. Hence, the capacity of cooling the space 23 to be cooled can be effectively increased by a combination of the first and second evaporators 15, 18.

The suction pressure of the compressor 11 is increased by the action of increasing pressure by the diffuser part 14d, which is expressed by ΔPeje, and hence the driving power of the compressor 11 can be reduced.

In FIG. 3, a pressure difference (P1-P2) between the pressure P1 of refrigerant flowing into the first evaporator 15 and the pressure P2 of refrigerant flowing in the second evaporator 18 is the amount of pressure increase caused by the ejector 14. Moreover, the pressure loss ΔPeba1 shows a pressure loss of refrigerant in the first evaporator 15. As is clear from FIG. 3, the evaporation pressure P2 of refrigerant in the second evaporator 18 is lower than the evaporation pressure (P1-ΔPeba1) of refrigerant in the first evaporator 15. Hence, the evaporation temperature of refrigerant in the second evaporator 18 is lower than the evaporation temperature of refrigerant in the first evaporator 15. For this reason, when the flow rate Ge of branch refrigerant flowing in the second evaporator 18 having the lower evaporation temperature of refrigerant is increased, the refrigeration capacity (Qer) of the entire refrigerant cycle is increased in the ejector cycle device.

However, as the flow rate Ge of branch refrigerant flowing in the second evaporator 18 is increased, the flow rate (Gn-Ge) of nozzle part refrigerant flowing in the nozzle part 14a of the ejector 14 is decreased and hence the amount of pressure increase ΔPeje caused by the ejector 14 is decreased to thereby increase the driving power L of the compressor 11. Hence, when the flow rate Ge of branch refrigerant flowing in the second evaporator 18 is excessively increased, COP (Qer/L) expressed by a ratio between the refrigeration capacity (Qer) of the entire refrigerant cycle and the driving power L of the compressor 11 is decreased. Conversely, even when the flow rate Ge of branch refrigerant flowing in the second evaporator 18 is excessively decreased, the refrigeration capacity (Qer) of the entire refrigerant cycle is decreased and hence COP (Qer/L) is also decreased.

Figure 4:
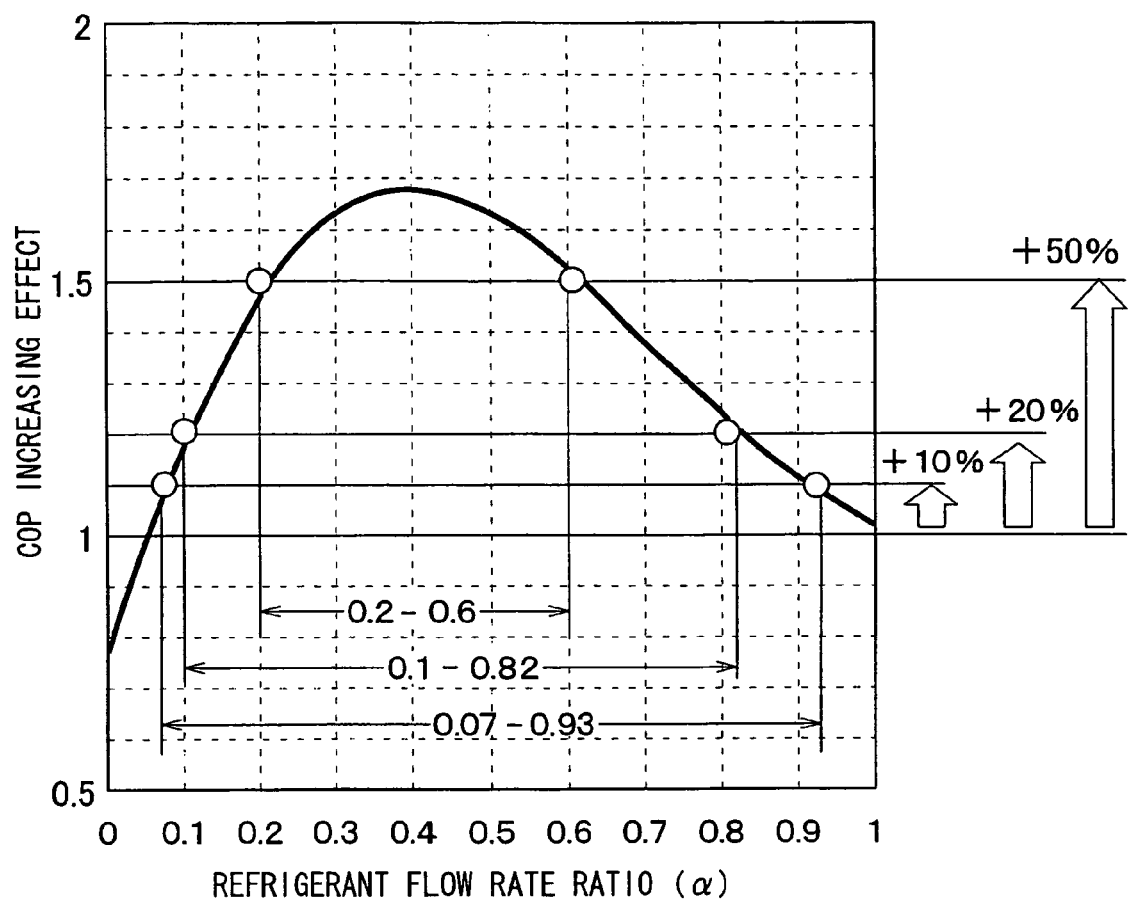
FIG. 4 is a graph showing a correlation between a refrigerant flow rate ratio α and a COP increasing effect in the ejector cycle device in FIG. 1.

Hence, the inventors of the present application, as shown in FIG. 4, revealed the correlation between a refrigerant flow rate ratio α and a COP increasing effect. Here, the refrigerant flow rate ratio α means a ratio (α=Ge/Gn) between the flow rate Ge of branch refrigerant flowing in the second evaporator 18 and the flow rate Gn of discharge refrigerant discharged from the compressor 11.

FIG. 4 shows a change in a COP increasing effect when the refrigerant flow rate ratio α is varied from 0 to 1 in the ejector cycle device 10. Here, the COP increasing effect means the value of COP of the ejector cycle device 10 when the COP of an expansion valve cycle is set at 1. That is, as the value of COP increasing effect is larger than 1, the COP increasing effect of the ejector cycle device 10 is more increased than the COP of the expansion valve cycle. Here, the expansion valve cycle is a refrigeration cycle constructed of a closed circuit in which a compressor, a refrigerant radiator, an expansion valve and an evaporator are successively connected to each other.

According to this FIG. 4, it is found that the COP increasing effect becomes smaller than 1 when the refrigerant flow rate ratio α is lower than a small predetermined value (first value) and when the refrigerant flow rate ratio α is larger a large predetermined value (second value). The COP increasing effect becomes larger than 1 within a region between the first value and the second value, and an optimal refrigerant flow rate ratio α at which the COP increasing effect becomes maximum can be set when the refrigerant flow rate ratio α is suitably set in a predetermined range within a middle range.

The reason is as follows: since the evaporation temperature of refrigerant in the second evaporator 18 is lower than the evaporation temperature of refrigerant in the first evaporator 15, increasing the flow rate Ge of branch refrigerant flowing in the second evaporator 18 allows the refrigeration capacity Qer of the entire refrigerant cycle to be increased and hence the COP is increased.

However, as the flow rate Ge of branch refrigerant flowing in the second evaporator 18 is increased, the flow rate (Gn-Ge) of refrigerant flowing in the nozzle part 14a of the ejector 14 is decreased and hence the amount of pressure increase ΔPeje by the ejector 14 is decreased. For this reason, when the flow rate Ge of branch refrigerant flowing in the second evaporator 18 is excessively increased, the driving power of the compressor 11 is increased and hence the COP is decreased.

Hence, it is found that if the refrigerant flow rate ratio α is set within a range from 0.07 or more to 0.93 or less like this embodiment by the setting of the degree of opening of the throttle mechanism 17, the COP can be increased by approximately 10% or more as compared with the COP of expansion valve cycle.

If the refrigerant flow rate ratio α is set within a range from 0.1 or more to 0.82 or less of this setting range, the COP can be more increased by approximately 20% or more as compared with the COP of expansion valve cycle.

Furthermore, if the refrigerant flow rate ratio α is set within a range from 0.2 or more to 0.6 or less of this setting range, COP can be still more increased by approximately 50% or more as compared with the COP of expansion valve cycle.

The refrigerant flow rate ratio α may be set within a range from 0.3 or more to 0.5 or less. Moreover, the refrigerant flow rate ratio a may be set within a range with center at approximately 0.4. Furthermore, the refrigerant flow rate ratio a may be set in any desirable range of arbitrary set ranges within 0.07-0.93. A desirable range of refrigerant flow rate ratio α can be determined according to efficiency required of a device.

A desirable range of refrigerant flow rate ratio α can be set within a range by setting efficiency required in a device. For example, a desirable range of refrigerant flow rate ratio α can be set within a range from approximately 0.14 or more to approximately 0.75 or less, a range from approximately 0.17 or more to approximately 0.58 or less, or a range from approximately 0.28 or more to approximately 0.52 or less.

The refrigerant flow rate ratio α can be set so that the flow rate Ge of branch refrigerant flowing in the second evaporator 18 is half or less of the flow rate Gn of discharge refrigerant discharged from the compressor 11. Furthermore, the refrigerant flow rate ratio α can be set so that the flow rate Ge of branch refrigerant flowing in the second evaporator 18 is smaller than the flow rate (Gn-Ge) of refrigerant flowing in the nozzle part 14a.

The range of the refrigerant flow rate ratio α becomes effective under conditions where the values of volumes, surface areas, and the like of the respective evaporators are set so as to exert capacity required of the cycle within the limitations of capacities of constituent elements of the cycle such as the compressor 11.

These refrigerant flow rate ratios α can be set by flow rate ratio setting means such as throttle mechanism 17. The flow rate ratio setting means can be supplied by an opening varying valve or a variable nozzle for adjusting a flow rate to the nozzle part 14a, a passage having a size set so as to acquire a specified ratio of flow rate, a branch part having a shape set so as to acquire a specified ratio of flow rate or a plurality of opening varying valves for adjusting the areas of the respective passages, and a control device for controlling these valves.

A cycle structure can be also employed in which a throttle mechanism is arranged on the upstream side of the branch part in place of or in addition to the throttle mechanism 17. Further, a cycle structure can be also employed in which a variable throttle mechanism and a capillary tube as a fixed type throttle mechanism are arranged in series.

Second Embodiment

The second embodiment of the present invention will be now described with reference to FIGS. 1, 2 and 5.

In the first embodiment, the COP is increased by setting the refrigerant flow rate ratio α within a predetermined range. However, in the second embodiment, when the total of a first core part volume Ce1 that is a refrigerant passage volume in the heat exchange core part 15a of the first evaporator 15 and a second core part volume Ce2 that is a refrigerant passage volume in the heat exchange core part 18a of the second evaporator 18 is set at a total volume Cn, the COP is increased by setting a volume ratio β(β=Ce/Cn) between the second core part volume Ce2 to the total core volume Cn within a predetermined range.

Here, the refrigerant passage volume in the heat exchange core part of the evaporator specifically means the total of volumes of hollow spaces 21a (FIG. 2) of the tubes 21 constructing the heat exchange core part of the evaporator.

In this embodiment, specifically, the first core part volume Ce1 and the second core part volume Ce2 are increased or decreased by increasing or decreasing the number of tubes 21 of the first and second evaporators 15, 18 in the first embodiment. With this, the volume ratio β between the second core part volume Ce2 and the total volume Cn is set within a predetermined range. In this embodiment, the volume ratio β of the second core part volume Ce2 to the total volume Cn is set within a range from 0.09 or more to 0.89 or less.

When the volume ratio β is too small, that is, when the second core part volume Ce2 is too small, refrigerant cannot be sufficiently evaporated in the second evaporator 18 and hence a cooling capacity corresponding to the flow rate Ge cannot be acquired. As a result, the refrigeration capacity Qer of the entire refrigerant cycle is decreased and hence the COP is decreased.

When the volume ratio β is too large, that is, when the first core part volume Ce1 is too small, refrigerant cannot be sufficiently evaporated in the first evaporator 15 and hence a cooling capacity corresponding to the flow rate Gn cannot be acquired. As a result, the refrigeration capacity Qer of the entire refrigeration cycle is decreased and hence the COP is decreased.

In other words, the COP is varied according to the volume ratio β and hence a range of volume ratio β capable of increasing the COP can be obtained.

Figure 5:
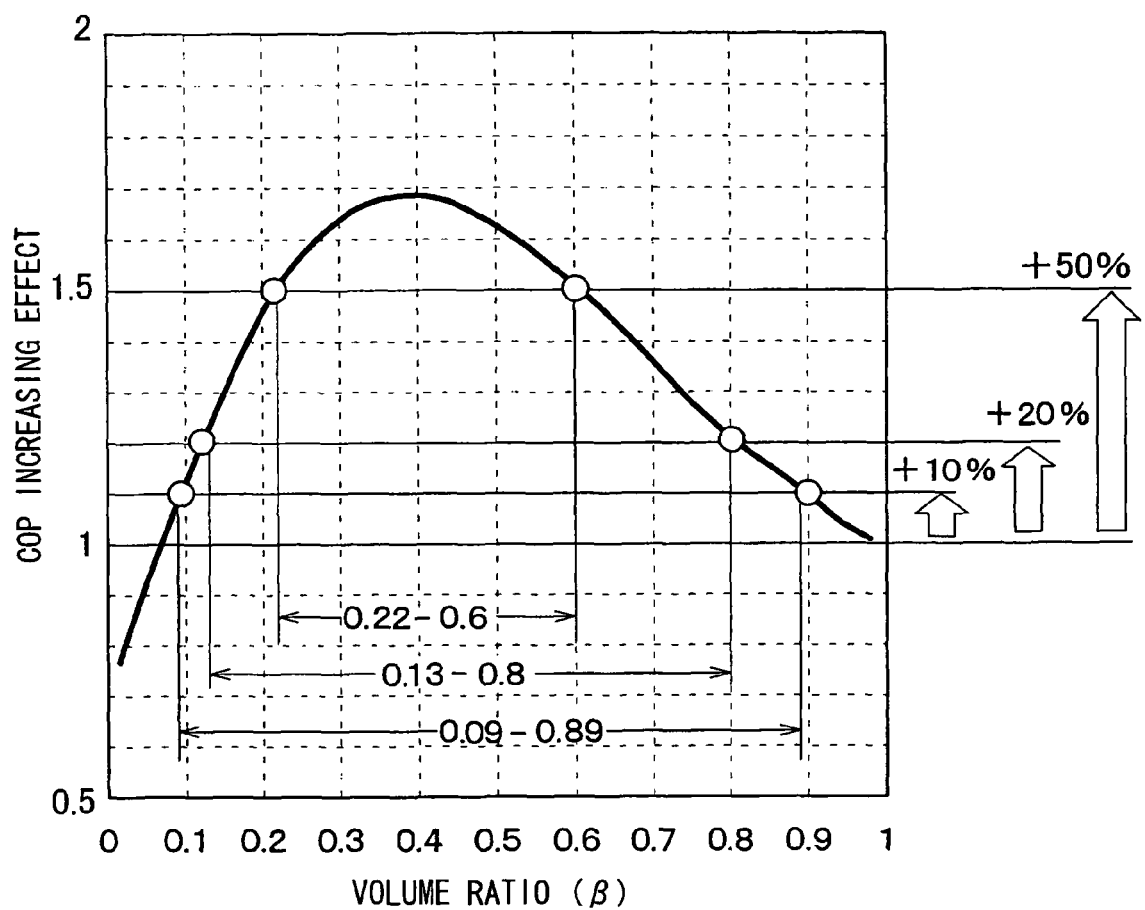
FIG. 5 is a graph showing a correlation between a volume ratio β and a COP increasing effect in the ejector cycle device in FIG. 1.

FIG. 5 is a graph showing a change in the COP increasing effect when the volume ratio β is varied from 0 to 1 in the ejector cycle device 10. Here, the COP increasing effect means the value of COP of the ejector cycle device 10 when the COP of an expansion valve cycle is set at 1. That is, as the value of COP increasing effect is larger than 1, the COP increasing effect of the ejector cycle device 10 is more increased than the COP of the expansion valve cycle.

Here, the expansion valve cycle is a refrigerant cycle constructed of a closed circuit in which the compressor, the refrigerant radiator, the expansion valve, and the evaporator, which have been described above, are successively connected to each other.

According to this FIG. 5, the COP increasing effect becomes smaller than 1 when the volume ratio β is smaller than a small predetermined value (first value), and when the volume ratio β is larger than a large predetermined value (second value). The COP increasing effect becomes larger than 1 within a range between the first value and the second value, and an optimal volume ratio β at which the COP increasing effect becomes maximum exists within a middle range.

Hence, if the volume ratio β is set within a range from 0.09 or more to 0.89 or less like this embodiment, refrigerant is appropriately evaporated in both of the first evaporator 15 and the second evaporator 18. Hence, it is found that the refrigeration capacity Qer of the entire refrigeration cycle is increased and hence the COP can be increased.

It is found that if the volume ratio β is set within a range from 0.13 or more to 0.8 or less of this setting range, the COP can be more increased.

It is found that if the volume ratio β is set within a range from 0.22 or more to 0.6 or less of this setting range, the COP can be still more increased.

In the second embodiment, the refrigerant cycle structure of the ejector cycle device can be made similarly to that of the ejector cycle device 10 shown in FIG. 1. Furthermore, the features of the second embodiment may be combined with the features of the first embodiment.

Third Embodiment

In the first embodiment, the COP is increased by setting the refrigerant flow rate ratio α within a predetermined range. In the second embodiment, the COP is increased by setting the volume ratio β within a predetermined range. However, in this embodiment, the COP is increased by setting a flow rate ratio/volume ratio difference (α-β), which is a difference between the refrigerant flow rate ratio α and the volume ratio β, within a predetermined range. That is, the third embodiment is a combination of the above-described first and second embodiments.

In this embodiment, specifically, both of the refrigerant flow rate ratio α and the volume ratio β are set so as to bring the difference (α-β) to within a range from -0.3 or more to 0.3 or less.

When the refrigerant flow rate ratio α is too large with respect to the volume ratio β, that is, when the flow rate Ge of refrigerant flowing in the second evaporator 18 is too large with respect to the second core part volume Ce2, refrigerant cannot be sufficiently evaporated in the second evaporator 18 and the COP is decreased.

When the refrigerant flow rate ratio α is too small with respect to the volume ratio β, that is, when the flow rate Gn of refrigerant flowing in the first evaporator 15 is too large with respect to the first core part volume Ce1, refrigerant cannot be sufficiently evaporated in the first evaporator 15 and the COP is decreased. In other words, the COP varies according to the flow rate ratio/volume ratio difference (α-β), and the range of the flow rate ratio/volume ratio difference (α-β) capable of increasing the COP can be obtained.

Hence, it is found that when the flow rate ratio/volume ratio difference (α-β) is set within a range from -0.3 or more to 0.3 or less like this embodiment, refrigerant is appropriately evaporated in both of the first evaporator 15 and the second evaporator 18 and hence the COP can be increased.

When the flow rate ratio/volume ratio difference ($\alpha-\beta$) is set within a range from −0.2 or more to 0.2 or less of this setting range, the COP can be more increased.

In addition, when the flow rate ratio/volume ratio difference ($\alpha-\beta$) is set within a range from −0.1 or more to 0.1 or less of this setting range, the COP can be still more increased.

In the third embodiment, the refrigerant cycle structure of the ejector cycle device can be made similarly to that of the ejector cycle device 10 shown in FIG. 1. Furthermore, the features of the third embodiment may be combined with the features of any one of the first and second embodiments.

Fourth Embodiment

In the first embodiment, the COP is increased by setting the refrigerant flow rate ratio $\alpha$ within a predetermined range. However, in this embodiment, the COP is increased by making a refrigerant passage area Fer1 in the heat exchange core part 15a of the first evaporator 15 larger than a refrigerant passage area Fer2 in the heat exchange core part 18a of the second evaporator 18 (Fer1>Fer2).

Here, the refrigerant passage area in the heat exchange core part of the evaporator specifically means the total of cross-sectional areas of the hollow spaces 21a of tubes 21 constructing the heat exchange core parts 15a, 18a of the evaporators 15, 18 and can be determined by the product of the cross-sectional area of the hollow space per one tube 21 and the number of tubes 21.

In this embodiment, specifically, the refrigerant passage area Fer1 of the first evaporator 15 is increased by increasing the number of tubes 21 of the first evaporator 15 in the first embodiment. With this, the refrigerant passage area Fer1 of the first evaporator 15 is made larger than refrigerant passage area Fer2 of the second evaporator 18.

The refrigerant passage area Fer1 of the first evaporator 15 may be increased by increasing the cross-sectional area of the hollow space per one tube 21 of the first evaporator 15.

In the ejector cycle device shown in FIG. 1, not only refrigerant condensed by the refrigerant radiator 13 but also refrigerant evaporated in the second evaporator 18 and mixed with the refrigerant flows into the first evaporator 15 and hence the degree of dryness of refrigerant flowing into the first evaporator 15 becomes high. That is, since the specific volume of refrigerant becomes large and the velocity of flow of refrigerant becomes large, a pressure loss $\Delta$Pebal of refrigerant in the first evaporator 15 becomes large.

As shown in FIG. 3, when the pressure loss $\Delta$Peba1 of refrigerant in the first evaporator 15 becomes large, the suction pressure of the compressor 11 is decreased to increase the driving power of the compressor 11, which results in decreasing the COP.

Hence, in this embodiment, the refrigerant passage area Fer1 of the first evaporator 15 is made larger than the refrigerant passage area Fer2 of the second evaporator 18 to decrease the pressure loss $\Delta$Peba1 of refrigerant in the first evaporator 15. Therefore, in the fourth embodiment, the driving power L of the compressor 11 can be decreased and hence the COP can be increased.

In the fourth embodiment, the refrigerant cycle structure of the ejector cycle device may be made similarly to that of the ejector cycle device 10 shown in FIG. 1. Furthermore, the features of the fourth embodiment may be combined with the features of any one of the first to third embodiments.

Fifth Embodiment

In the above-described first embodiment, the COP is increased by setting the refrigerant flow rate ratio $\alpha$ within a predetermined range. However, in this embodiment, the COP is increased by making a heat transfer area ratio $\gamma 2 (=\text{Hea}2/\text{Her}2)$, which is a ratio between an air-side heat transfer area Hea2 and a refrigerant-side heat transfer area Her2 in the second evaporator 18, larger than a heat transfer area ratio $\gamma 1 (=\text{Hea}1/\text{Her}1)$, which is a ratio between an air-side heat transfer area Hea1 and a refrigerant-side heat transfer area Her1 in the first evaporator 15 ($\gamma 2 > \gamma 1$). That is, the heat transfer area ratio $\gamma 2$ in the second evaporator 18 is set larger than the heat transfer area ratio $\gamma 1$ in the first evaporator 15.

Here, the air-side heat transfer area in the evaporator means the total of areas of parts with which air is put into contact of the heat exchange core part of the evaporator. Specifically, the air-side heat transfer area in the evaporator is the total of surface areas of the outer peripheral areas of the tubes 21 and the surface areas of the heat transfer fins 22. Moreover, the refrigerant-side heat transfer area in the evaporator means the total of areas of parts with which refrigerant is put into contact of the heat exchange core part of the evaporator. Specifically, the refrigerant-side heat transfer area in the evaporator is the total of surface areas of the inner peripheral areas of the tubes 21.

In this embodiment, specifically, the air-side heat transfer area Hea2 of the second evaporator 18 is increased by narrowing the fin pitch P (FIG. 2) of the corrugated heat transfer fin 22 of the second evaporator 18 in the first embodiment. With this, the heat transfer area ratio $\gamma 2$ of the second evaporator 18 can be made larger than the heat transfer area ratio $\gamma 1$ of the first evaporator 15.

By the way, in the ejector cycle device 10 shown in FIG. 1, the second evaporator 18 is arranged on the downstream side of the flow of air A of the first evaporator 15 and hence the temperature of suction air of the second evaporator 18 becomes lower than the temperature of suction air of the first evaporator 15. For this reason, the specific volume of suction air of the second evaporator 18 is decreased and the velocity of flow of refrigerant is decreased, whereby the coefficient of heat transfer of the second evaporator 18 is decreased. As a result, the refrigeration capacity of the second evaporator 18 is decreased and hence the COP is decreased.

Hence, in this fifth embodiment, the heat transfer area ratio $\gamma 2$ of the second evaporator 18 is made larger than the heat transfer area ratio $\gamma 1$ of the first evaporator 15 to increase the refrigeration capacity of the second evaporator 18. With this, the refrigeration capacity Qer of the entire refrigeration cycle can be increased and hence the COP can be increased.

Although a corrugated fin type evaporator is employed as the evaporator in this embodiment (see FIG. 2), various types of heat exchangers can be employed as the evaporator 15, 18. For example, a heat exchanger of a lamination type using a corrugated fin, a heat exchanger of a header and tube type using a corrugated fin, and a heat exchanger of a plate fin type using a plate-shaped heat transfer fin or a wavy plate-shaped heat transfer fin can be employed as the evaporator 15, 18.

Still further, while the COP is increased by narrowing the fin pitch P of the heat transfer fin 22, the same effect can be produced also by densely forming many cut portions (louvers, not shown) in the heat transfer fin 22.

That is, many cut portions are formed in the heat transfer fin 22 so as to increase the heat transfer ability of the evaporator and these many cut portions are densely formed to increase the number of cut portions. With this, the heat transfer ability of the second evaporator 18 can be increased. As a result, the refrigeration capacity of the second evaporator 18 can be increased and hence the COP can be increased.

Furthermore, the features of the fifth embodiment may be combined with the features of any one of the first to fourth embodiments.

Sixth Embodiment

In the first embodiment, one space 23 to be cooled is cooled by one set of first and second evaporators 15, 18. However, in this embodiment, two spaces 23, 24 to be cooled are separately cooled by two sets of first and second evaporators 15,18.

Figure 6:
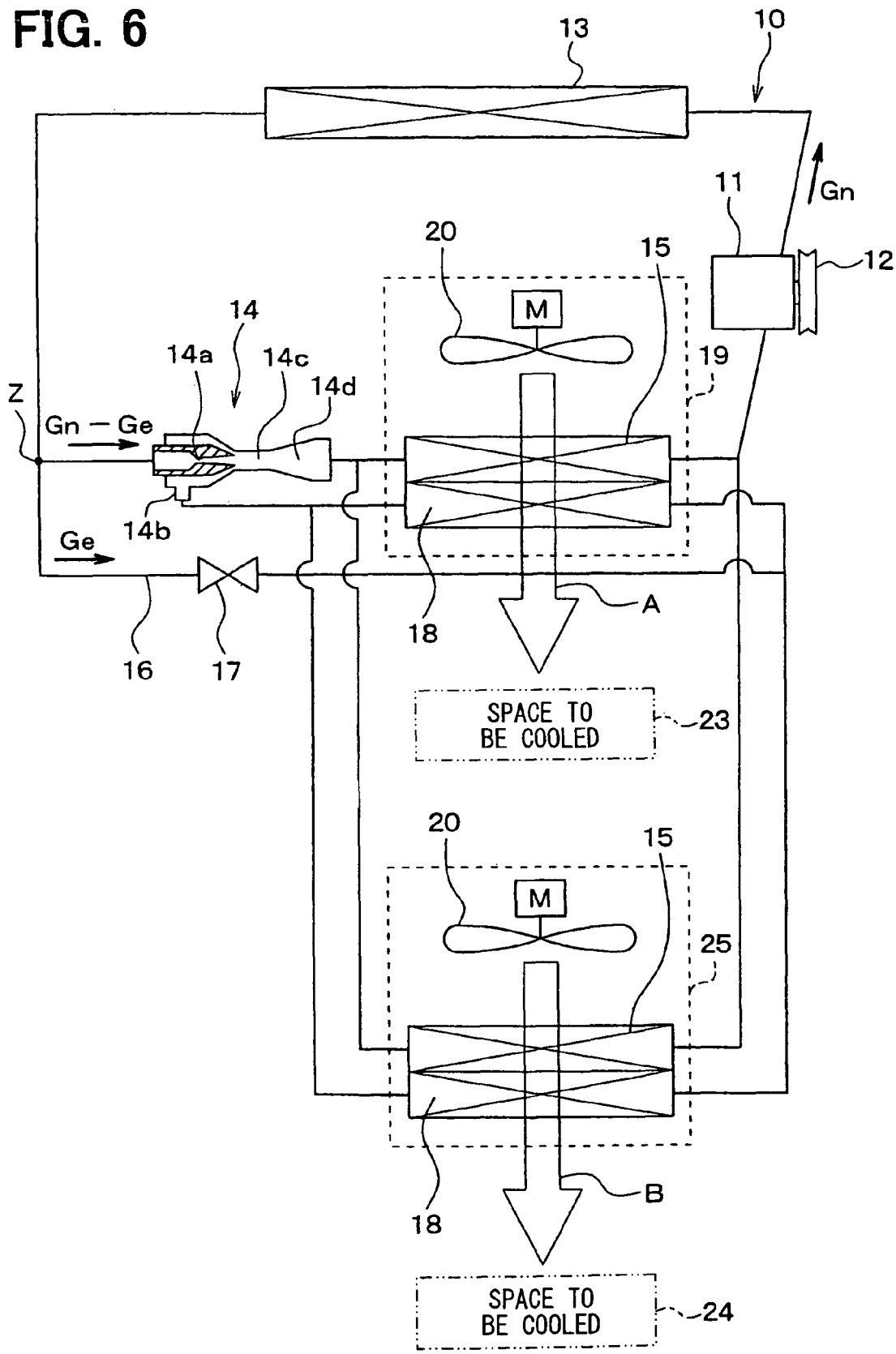
FIG. 6 is a schematic diagram of an ejector cycle device according to a sixth embodiment of the present invention.

FIG. 6 is a schematic diagram of an ejector cycle device 10 according to this embodiment. Two first evaporators 15 are connected in parallel between the diffuser part 14d of the ejector 14 and the suction side of the compressor 11. Moreover, two second evaporators 18 are connected in parallel between the throttle mechanism 17 and the refrigerant suction port 14b of the ejector 14.

These two first evaporators 15 and two second evaporators 18 are housed in two cases 19, 25, on a one-to-one-case basis, respectively. That is, a set of the first evaporator 15 and the second evaporator 18 is located in the one case 19, and another set of the first evaporator 15 and the second evaporator 18 is located in the other case 25. Electrically operated blowers 20 are arranged in these cases 19, 25, respectively. With this, a first flow of air A is produced in the one case 19 of the two cases 19, 25 and a second flow of air B is produced in the other case 25.

Of the two evaporators 15, 18 housed in the one case 19, the first evaporator 15 connected to the downstream side of the diffuser part 14d of the ejector 14 is arranged on the upstream side in the flow of air A and the second evaporator 18 connected to the refrigerant suction port 14b of the ejector 14 is arranged on the downstream side in the flow of air A.

These two first and second evaporators 15, 18 may be integrally constructed with each other just as with the first embodiment or may be constructed separately.

Similarly, of the two evaporators 15, 18 housed in the other case 25, the first evaporator 15 connected to the downstream side of the ejector 14 is arranged on the upstream side in the flow of air B and the second evaporator 18 connected to the refrigerant suction port 14b of the ejector 14 is arranged on the downstream side in the flow of air B.

Cool air cooled by both of the first and second evaporators 15, 18 housed in the case 19 is blown off into the space 23 to be cooled. Moreover, cool air cooled by both of the first and second evaporators 15, 18 housed in the case 25 is blown off into the space 24 to be cooled, which is different from the space 23 to be cooled.

According to the construction, two separate spaces 23, 24 to be cooled can be cooled by two sets of first and second evaporators 15,18.

Similarly, three or more sets of first and second evaporators 15,18 may be arranged in the same construction. With this, three or more separate spaces to be cooled can be cooled.

Furthermore, the features described in any one of the first to fifth embodiments can be used in the ejector cycle device 10 of the sixth embodiment.

Seventh Embodiment

In the first embodiment, the common space 23 is cooled by the first and second evaporators 15,18 housed in one case 19. However, in this embodiment, as shown in FIG. 7, the first evaporator 15 and the second evaporator 18 are housed in two separate cases 19, 25, respectively, and the first evaporator 15 and the second evaporator 18 cool two separate spaces 23, 24, respectively.

Figure 7:
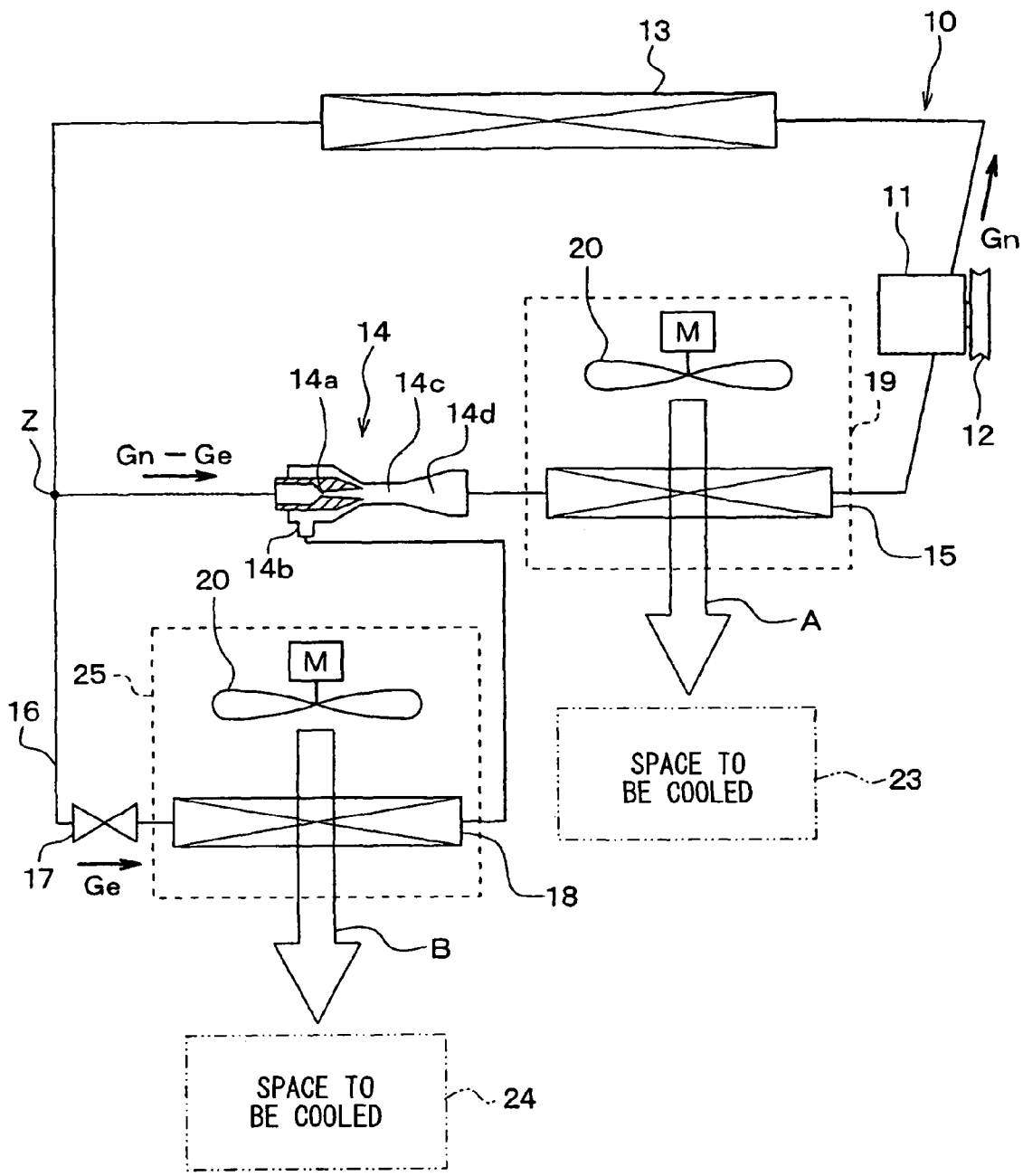
FIG. 7 is a schematic diagram of an ejector cycle device according to a seventh embodiment of the present invention.

FIG. 7 is a schematic diagram of an ejector cycle device 10 according to the seventh embodiment. In this embodiment, the first evaporator 15 and the second evaporator 18 are separately constructed and are separately housed in two cases 19, 25, respectively. Specifically, the first evaporator 15 is housed in one case 19 and the second evaporator 18 is housed in the other case 25.

Electrically operated blowers 20 are arranged in these two cases 19, 25, respectively. With this, a first flow of air A is produced in one case 19 of the two cases 19, 25 and a second flow of air B is produced in the other case 25.

Cool air cooled by the first evaporator 15 housed in the case 19 is blown off into the space 23 to be cooled. Moreover, cool air cooled by the second evaporator 18 housed in the case 25 is blown off into the space 24 to be cooled, which is different from the space 23 to be cooled.

According to the construction, two separate spaces 23, 24 to be cooled can be cooled by the first and second evaporators 15, 18, respectively.

Furthermore, the features described in any one of the first to fifth embodiments can be used in the ejector cycle device 10 of the seventh embodiment.

Other Embodiments

Although the present invention has been fully described in connection with the preferred embodiments thereof with reference to the accompanying drawings, it is to be noted that various changes and modifications will become apparent to those skilled in the art.

For example, in the respective embodiments, the flow rate Ge of branch refrigerant branched to the second evaporator 18 is adjusted by the throttle mechanism 17. However, the flow rate Ge of branch refrigerant branched to the second evaporator 18 may be adjusted by adjusting the flow rate (Gn-Ge) of nozzle part refrigerant flowing in the nozzle part 14a by using a variable ejector of a nozzle opening varying type as the ejector 14. With this, the throttle mechanism 17 can be eliminated.

In this regard, the variable ejector is an ejector having a passage area varying mechanism capable of variably controlling the area of passage of refrigerant of the nozzle part by a signal from the outside.

In the embodiments, the examples have been described in which the refrigerant is R404A. However, the refrigerant may be changed to various kinds of refrigerants such as $CO_2$, HC, R134a, R410A, or R407A.

Furthermore, the refrigerant cycle device according to any one of the above-described first to seventh embodiments may be provided with a gas-liquid separator that is located between the first evaporator 15 and the compressor 11 or between the refrigerant radiator 13 and the nozzle part 14a of the ejector 14. Here, the gas liquid separator is used for separating gas refrigerant and liquid refrigerant from each other, and for storing excess refrigerant in a refrigerant cycle of the ejector cycle device.

In the embodiments, the ejector cycle device according to the present invention is applied to a refrigeration device for a vehicle. However, the ejector cycle device according to the present invention may be applied to a vapor compressing type cycle such as a heat pump cycle for a stationary type cold storage, a stationary type refrigerator, an air conditioner, and a water heater.

Such changes and modifications are to be understood as being within the scope of the present invention as defined by the appended claims.

What is claimed is:

1. An ejector cycle device comprising:
a compressor for drawing and compressing refrigerant;
a refrigerant radiator for radiating heat of high-pressure refrigerant discharged from the compressor;
an ejector having a nozzle part for decompressing refrigerant from the refrigerant radiator, and a refrigerant suction port for drawing refrigerant by a high-velocity flow of refrigerant jetted from the nozzle part;
a branch passage for introducing refrigerant branched from a branch portion located on an upstream side of the nozzle part of the ejector in a refrigerant flow direction into the refrigerant suction port;
a first evaporator arranged on a downstream side of the ejector in the refrigerant flow direction for evaporating the refrigerant; and
a second evaporator arranged in the branch passage for evaporating the refrigerant,
a flow rate of refrigerant discharged from the compressor is divided into a first flow rate of refrigerant flowing in the second evaporator and a second flow rate of refrigerant flowing into the nozzle part of the ejector;
wherein a refrigerant flow rate ratio ($\alpha$) of the first flow rate of refrigerant flowing in the second evaporator to the flow rate of refrigerant discharged from the compressor is set within a range from 0.07 or more to 0.93 or less;
a refrigerant flow rate ratio ($\Delta$) of the second flow rate of refrigerant flowing into the nozzle part of the ejector to the flow rate of refrigerant discharged from the compressor is in a range of 1.0—the refrigerant flow rate ratio ($\alpha$); and
the only refrigerant flowing to the refrigerant suction port of the ejector is refrigerant branched at the branch portion and flowing through the branch passage.

2. The ejector cycle device as in claim 1, wherein the refrigerant flow rate ratio ($\alpha$) is set within a range from 0.1 or more to 0.82 or less.

3. The ejector cycle device as in claim 2, wherein the refrigerant flow rate ratio ($\alpha$) is set within a range from 0.2 or more to 0.6 or less.

4. The ejector cycle device as in claim 1, wherein:
the first evaporator includes a heat exchange core part having a refrigerant passage volume as a first core part volume;
the second evaporator includes a heat exchange core part having a refrigerant passage volume as a second core part volume; and
when a total of the first core part volume of the heat exchange core part of the first evaporator and the second core part volume of the heat exchange core part of the second evaporator is assumed to be a total volume, a volume ratio ($\beta$) of the second core part volume to the total volume is set within a range from 0.09 or more to 0.89 or less.

5. The ejector cycle device as in claim 4, wherein a flow ratio difference ($\alpha-\beta$) between the refrigerant flow rate ratio ($\alpha$) and the volume ratio ($\beta$) is set within a range from −0.3 or more to 0.3 or less.

6. The ejector cycle device as in claim 1, wherein:
the first evaporator includes a heat exchange core part having a refrigerant passage area;
the second evaporator includes a heat exchange core part having a refrigerant passage area; and
the refrigerant passage area in the heat exchange core part of the first evaporator is larger than the refrigerant passage area in the heat exchange core part of the second evaporator.

7. The ejector cycle device as in claim 1, wherein:
the first evaporator has an air-side heat transfer area and a refrigerant-side heat transfer area;
the second evaporator has an air-side heat transfer area and a refrigerant-side heat transfer area; and
a heat transfer area ratio ($\gamma 2$) of the air-side heat transfer area to the refrigerant-side heat transfer area in the second evaporator, is made larger than a heat transfer area ratio ($\gamma 1$) of the air-side heat transfer area to the refrigerant-side heat transfer area in the first evaporator.

8. The ejector cycle device as in claim 1, wherein the second evaporator is arranged on a downstream side in a flow of air passing through the first evaporator.

9. The ejector cycle device as in claim 1, wherein:
the first evaporator is located to cool a first space; and
the second evaporator is located to cool a second space which is different from the first space.

10. The ejector cycle device as in claim 1, wherein a plurality of the first evaporators are arranged in parallel to a flow of refrigerant, and wherein a plurality of the second evaporators are arranged in parallel to a flow of refrigerant.

11. The ejector cycle device as in claim 1, wherein the ejector further includes
a pressure-increasing part in which the refrigerant jetted from the nozzle part and the refrigerant drawn from the refrigerant suction port are mixed while a pressure of refrigerant to be introduced to the compressor is increased.

12. An ejector cycle device comprising:
a compressor for drawing and compressing refrigerant;
a refrigerant radiator for radiating heat of high-pressure refrigerant discharged from the compressor;
an ejector having a nozzle part for decompressing refrigerant from the refrigerant radiator, and a refrigerant suction port for drawing refrigerant by a high-velocity flow of refrigerant jetted from the nozzle part;
a branch passage for introducing refrigerant branched from a branch portion located on an upstream side of the nozzle part of the ejector in a refrigerant flow direction into the refrigerant suction port;
a first evaporator arranged on a downstream side of the ejector in the refrigerant flow direction and for evaporating the refrigerant; and
a second evaporator arranged in the branch passage and for evaporating the refrigerant, wherein:
the first evaporator includes a heat exchange core part having a refrigerant passage volume as a first core part volume;
the second evaporator includes a heat exchange core part having a refrigerant passage volume as a second core part volume; and
when a total of the first core part volume of the heat exchange core part of the first evaporator and the second core part volume of the heat exchange core part of the second evaporator is assumed to be a total volume, a volume ratio ($\beta$) of the second core part volume to the total volume is set within a range from 0.09 or more to 0.89 or less; wherein
the only refrigerant flowing to the refrigerant suction port of the ejector is refrigerant branched at the branch portion and flowing through the branch passage.

13. The ejector cycle device as in claim 12, wherein the volume ratio ($\beta$) is set within a range from 0.13 or more to 0.8 or less.

14. The ejector cycle device as in claim 13, wherein the volume ratio ($\beta$) is set within a range from 0.22 or more to 0.6 or less.

15. The ejector cycle device as in claim 12, wherein the second evaporator is arranged on a downstream side in a flow of air passing through the first evaporator.

16. The ejector cycle device as in claim 12, wherein:
the first evaporator is located to cool a first space; and
the second evaporator is located to cool a second space which is different from the first space.

17. The ejector cycle device as in claim 12, wherein a plurality of the first evaporators are arranged in parallel to a flow of refrigerant, and wherein a plurality of the second evaporators are arranged in parallel to a flow of refrigerant.

18. An ejector cycle device comprising:
a compressor for drawing and compressing refrigerant;
a refrigerant radiator for radiating heat of high-pressure refrigerant discharged from the compressor;
an ejector having a nozzle part for decompressing refrigerant from the refrigerant radiator, and a refrigerant suction port for drawing refrigerant by a high-velocity flow of refrigerant jetted from the nozzle part;
a branch passage for introducing refrigerant branched from a branch portion located on an upstream side of the nozzle part of the ejector in a refrigerant flow into the refrigerant suction port;
a first evaporator arranged on a downstream side of the ejector in the refrigerant flow and for evaporating the refrigerant; and
a second evaporator arranged in the branch passage and for evaporating the refrigerant, wherein:
the first evaporator includes a heat exchange core part having a refrigerant passage volume as a first core part volume;
the second evaporator includes a heat exchange core part having a refrigerant passage volume as a second core part volume;
when a ratio of a flow rate of refrigerant flowing in the second evaporator to a flow rate of refrigerant discharged from the compressor is set as a refrigerant flow rate ratio ($\alpha$), and when a total of the first core part volume of the heat exchange core part of the first evaporator and the second core part volume of the heat exchange core part of the second evaporator is assumed to be a total volume, and when a ratio of the second core part volume to the total volume is set as a volume ratio ($\beta$), a ratio difference ($\alpha-\beta$) between the refrigerant flow rate ratio ($\alpha$) and the volume ratio ($\beta$) is set within a range from −0.3 or more to 0.3 or less; and
the only refrigerant flowing to the refrigerant suction port of the ejector is refrigerant branched at the branch portion and flowing through the branch passage.

19. The ejector cycle device as in claim 18, wherein the ratio difference ($\alpha-\beta$) is set within a range from −0.2 or more to 0.2 or less.

20. The ejector cycle device as in claim 19, wherein the ratio difference ($\alpha-\beta$) is set within a range from −0.1 or more to 0.1 or less.

21. An ejector cycle device comprising:
a compressor for drawing and compressing refrigerant;
a refrigerant radiator for radiating heat of high-pressure refrigerant discharged from the compressor;
an ejector having a nozzle part for decompressing refrigerant from the refrigerant radiator, and a refrigerant suction port for drawing refrigerant by a high-velocity flow of refrigerant jetted from the nozzle part;
a branch passage for introducing refrigerant branched from a branch portion located on an upstream side of the nozzle part of the ejector in a refrigerant flow direction into the refrigerant suction port;
a first evaporator arranged on a downstream side of the ejector in the refrigerant flow direction and for evaporating the refrigerant; and
a second evaporator arranged in the branch passage and for evaporating the refrigerant, wherein:
the first evaporator includes a heat exchange core part having a refrigerant passage area;
the second evaporator includes a heat exchange core part having a refrigerant passage area;
the refrigerant passage area in the heat exchange core part of the first evaporator is larger than the refrigerant passage area in the heat exchange core part of the second evaporator; and
the only refrigerant flowing to the refrigerant suction port of the ejector is refrigerant branched at the branch portion and flowing through the branch passage.

22. An ejector cycle device comprising:
a compressor for drawing and compressing refrigerant;
a refrigerant radiator for radiating heat of high-pressure refrigerant discharged from the compressor;
an ejector having a nozzle part for decompressing refrigerant from the refrigerant radiator, and a refrigerant suction port for drawing refrigerant by a high-velocity flow of refrigerant jetted from the nozzle part;
a branch passage for introducing refrigerant branched from a branch portion on an upstream side of the nozzle part of the ejector in a refrigerant flow direction into the refrigerant suction port;
a first evaporator arranged on a downstream side of the ejector in the refrigerant flow direction and for evaporating the refrigerant; and
a second evaporator arranged in the branch passage and for evaporating the refrigerant, wherein:
the first evaporator has an air-side heat transfer area and a refrigerant-side heat transfer area;
the second evaporator has an air-side heat transfer area and a refrigerant-side heat transfer area;
a heat transfer area ratio ($\gamma 2$) of the air-side heat transfer area to the refrigerant-side heat transfer area in the second evaporator, is larger than a heat transfer area ratio ($\gamma 1$) of the air-side heat transfer area to the refrigerant-side heat transfer area in the first evaporator; and
the only refrigerant flowing to the refrigerant suction port of the ejector is refrigerant branched at the branch portion and flowing through the branch passage.

* * * * *